June 25, 1940.  A. ARUTUNOFF  2,205,783
METHOD AND APPARATUS FOR STRAIGHTENING HOUSINGS
Filed Oct. 21, 1937   2 Sheets-Sheet 1
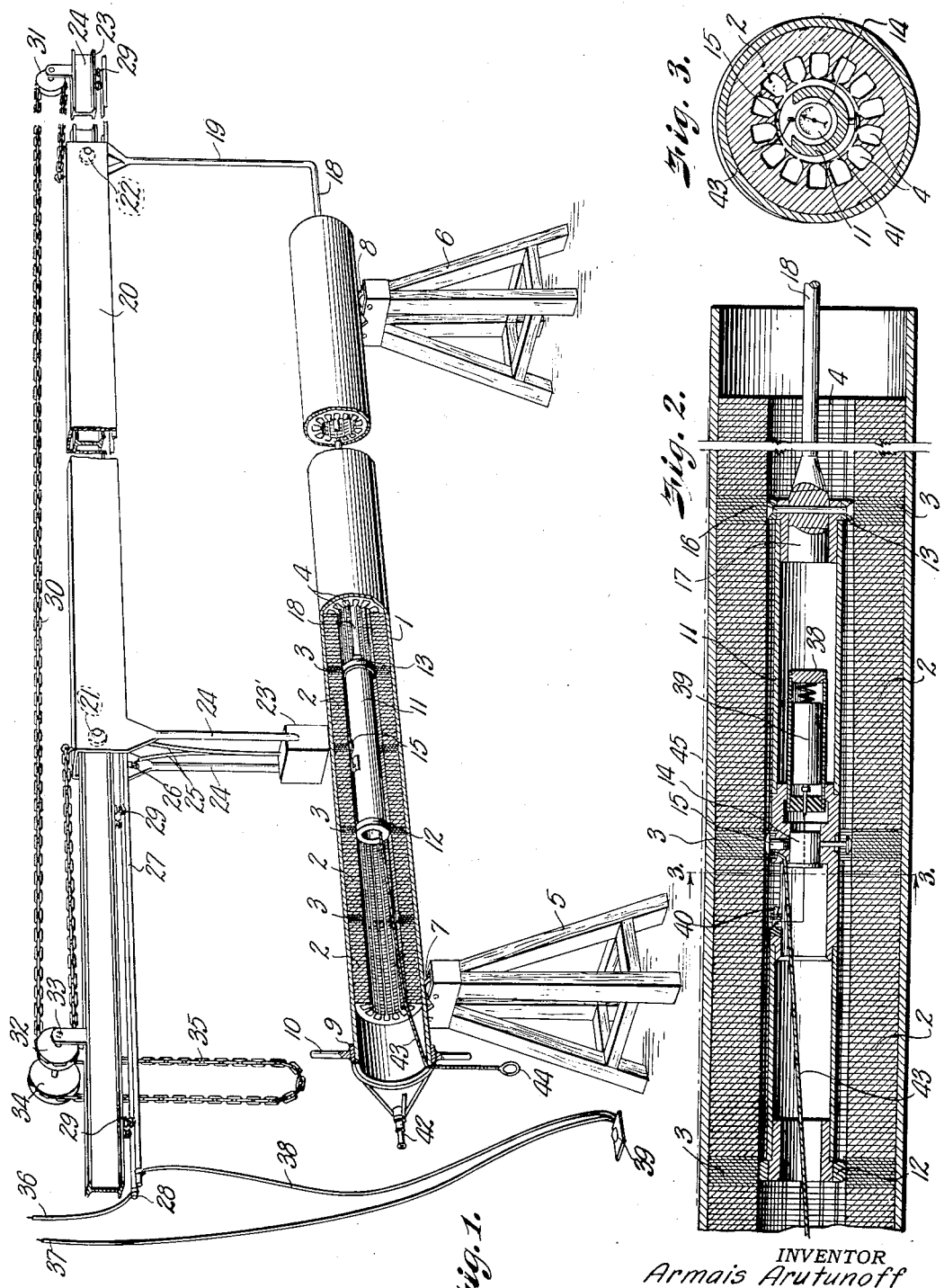
INVENTOR
Armais Arutunoff
BY
ATTORNEY June 25, 1940.  A. ARUTUNOFF  2,205,783
METHOD AND APPARATUS FOR STRAIGHTENING HOUSINGS
Filed Oct. 21, 1937  2 Sheets-Sheet 2
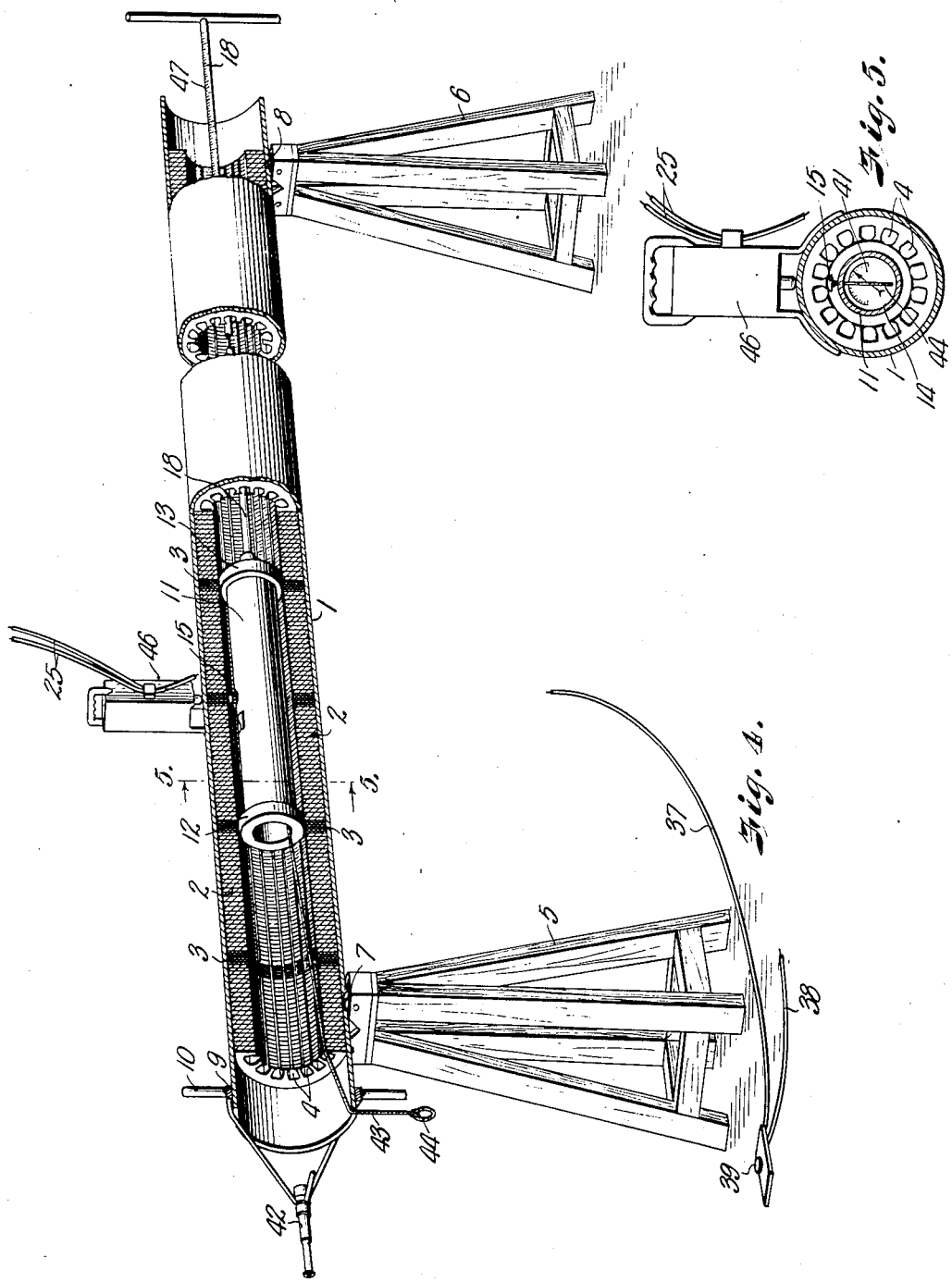
INVENTOR
Armais Arutunoff
BY
ATTORNEY Patented June 25, 1940

2,205,783

UNITED STATES PATENT OFFICE 2,205,783

METHOD AND APPARATUS FOR STRAIGHTENING HOUSINGS

Armais Arutunoff, Bartlesville, Okla., assignor to Reda Pump Company, Bartlesville, Okla., a corporation of Delaware Application October 21, 1937, Serial No. 170,241

7 Claims. (Cl. 153—52)

My invention relates to a method and apparatus for straightening housings and more particularly to straightening housings for the electric motors of deep well pumps.

The electric motors for driving deep well pumps must necessarily be of comparatively small cross sectional dimension. In a deep oil well, for example, 5,000 feet in depth, an electric motor of 100 horsepower is required to drive the pump for pumping the fluid out of the well. In order to obtain an electric motor of this power, within the confines of an external diameter of less than six inches, it is necessary to make the motor of great length with respect to its diameter.

In a motor of my invention, I have provided a stator comprising a plurality of magnetic and non-magnetic laminations assembled in an elongated housing. The non-magnetic laminations form supports for the bearings of the rotor shaft. The rotor shaft obviously will be of great length and must necessarily be of comparatively small diameter. For example, in a motor producing 100 horsepower, a one and three-eighths inch rotor shaft is employed of a length of about 20 feet. It will be obvious to those skilled in the art that this shaft must be supported at a plurality of places therealong, and unless the bearings are accurately aligned, the lateral thrust produced by distortions or eccentricity in the alignment of the bearings will soon destroy the bearings.

The problem of straightening a motor housing containing a plurality of laminations is no simple one. In order that the motor be efficient, it is necessary that the clearance between the rotor and the stator be comparatively small in order that the smallest possible air gap may be employed. It follows, therefore, that, aside from the necessity of accurate alignment occasioned by the bearings, accurate alignment must be achieved for efficiency of performance of the motor. In practice, I employ an air gap of .014 of an inch.

One object of my invention is to provide a novel method of straightening a motor housing of great length with respect to its diameter.

Another object of my invention is to provide a method for aligning the bearing supports formed by non-magnetic laminations assembled in an elongated housing.

Another object of my invention is to provide a novel apparatus for straightening elongated housings.

Other and further objects of my invention will appear from the following description.

In the accompanying drawings which form part of the instant specification and are to be read in conjunction therewith and in which like reference numerals are used to indicate like parts in the various views;

Figure 1 is a perspective view of one form of apparatus containing an embodiment of the apparatus of my invention and capable of carrying out the method of my invention.

Figure 2 is an enlarged detail sectional view of a portion of a housing containing stator laminations and a bore gauge forming part of the apparatus of my invention.

Figure 3 is a sectional view taken on a line 3—3 of Figure 2.

Figure 4 is a perspective view of another form of apparatus capable of carrying out the method of my invention.

Figure 5 is a sectional view taken on a line 5—5 of Figure 4.

More particularly, referring now to the drawings, an elongated casing 1 houses a plurality of magnetic laminations 2, forming the stator of an induction motor. Groups of non-magnetic laminations 3 are assembled at a plurality of separated places along the stator. These groups of non-magnetic laminations form supports for bearing rings in which the rotor shaft bearings are assembled. Each of the laminations 2 is provided with a plurality of slots 4 adapted to receive the winding of the stator.

The problem of alignment involves insuring that each group of non-magnetic laminations is in alignment with every other group of non-magnetic laminations. The clearance between the bearing rings and the non-magnetic laminations is only .001 of an inch, while the clearance between the rotor and the magnetic laminations is .014 of an inch.

The housing to be straightened is placed upon a pair of supports 5 and 6, provided with bearing rollers 7 and 8. A clamp 9 is fitted to one end of the housing 1, which clamp is provided with handles 10. The housing can be rotated upon bearing rollers 7 and 8 by means of handles 10.

A bore gauge forming part of my apparatus for use in carrying out the method of my invention comprises a tubular member 11 somewhat smaller in diameter than the bore formed by the assembled laminations. Secured to respective ends of the tubular member are flanges 12 and 13, whose external diameter is identical with the external diameter of the bearing rings supported by groups of non-magnetic laminations 3. The distance between flanges 12 and 13 is the distance from one group of non-magnetic laminations to a third group of non-magnetic laminations removed from said first group. A gauge 14 is supported by the tubular member 11 at a point intermediate its ends. The gauge is provided with a gauging finger 15, urged outwardly by a spring as is well understood in the art. One end of the gauge is secured by a pin 16 to a head 17, formed on the end of a rod 18. The rod 18 is provided with an extension 19 which is secured to an elongated member 20. Member 20 is provided with rollers 21 and 22 adapted to ride upon the flanges 23 of an I-beam 24 which is supported overhead in any suitable manner. From member 20 by cross-pieces 24' is supported an electric hammer 23'. The arrangement is such that the electric hammer is directly over the gauging finger 15. A pair of conductors 25 terminate in respective brushes 26 engaging bus bars 27 and 28 which are supported from the I-beam by insulators 29. Secured to the ends of member 20 is a chain 30 passing over pulleys 31 and 32. Pulley 32 is keyed to a shaft 33 which carries a pulley 34. Pulley 34 is provided with means for rotating the same, as for example, a chain 35. As the chain 35 is pulled, pulley 34 is rotated, which will, in turn, rotate shaft 33 to move member 20 forward and backward on rollers 21 and 22. The motion of member 20 will be transmitted through rods 19 and 18 to the gauging assembly and the electric hammer 23' will be likewise moved with the gauge so that it will always be in proper position for the straightening operation which will be hereinafter described. The power for the electric hammer is supplied through a pair of mains 36 and 37, current passing from main 36 through bus bar 28, through one brush 26, through one conductor 25, through the windings of the electric hammer motor, through the other conductor 25, through the other brush 26 to bus bar 27 through conductor 38, through a foot switch 39 to the other side of the main line 37.

Within the member 11 I mount a small housing 38 which carries a dry cell 39, adapted to furnish energy for lighting an incandescent lamp 40. Incandescent lamp 40 is mounted to illuminate the face 41 of the gauge 14. A telescope 42 is focused upon the face of the gauge so that the operator may read the gauge from one end of the housing.

Secured to the gauging finger 15 is a flexible member 43 terminating in a ring 44 positioned outside of the bore. When flexible member 43 is placed under tension, the gauging finger 15 will be withdrawn from contact with the laminations in which the gauging assembly is positioned.

In operation, referring now to Figure 3, the gauging assembly is positioned within the bore with flanges 12 and 13 resting upon two groups of non-magnetic laminations separated by a group of magnetic laminations against which the gauging finger 15 rests. The housing is then rotated by means of handles 16, the operator observing the face 41 of the gauge 14. Let us assume that the housing embraced between the gauging assembly is deflected. As the housing is rotated, the gauge pointer will move back and forth indicating an eccentricity.

Referring now to Figure 2, the gauging assembly is positioned in a housing which is deflected downwardly, the construction line 45 in the figure indicating the position which would be occupied by the housing if it were straight. When the low point is uppermost, the gauge will show the maximum thrust, that is, the gauging finger 15 will be moved inwardly through the greatest distance. It is understood that the gauge is of the type which has a gauging finger urged outwardly by a spring. As the gauging finger is depressed, a pointer upon the gauge face indicates the extent of depression.

As the housing is rotated, the operator watches the gauging face and knows the maximum thrust of the pointer indicating the point at which the gauge finger is depressed to the greatest extent. At this point, the operator stops rotating the housing with the low point upwardly. At this point, the operator closes the switch 39 and operates the electric peening hammer to peen the metal adjacent the lowest point of the housing. One would think that, in order to straighten a housing, the hammering should take place at the high point. The contrary, however, is the fact. What happens is that, during the peening, the metal of the housing is hammered against the stator laminations, acting as an anvil, by the hammer. The plurality of indentations imparted by the peening hammer elongates the housing, and the metal tends to warp or elongate longitudinally of the housing. It is understood, of course, that, during the peening, the chain 35 may be moved back and forth slightly, or the handles 16 oscillated slightly, or both, so that the peening may be spread over a slight area adjacent the low point. Prior to closing the switch 39, the handle 44 is pulled so that the gauging finger 15 is moved from contact with the bore of the stator during the peening operation. This prevents injury to the gauge. The extent of peening will vary depending on how great the deflection at the particular point happened to be. Experience will soon enable an operator to gauge fairly accurately the amount of peening necessary. After peening for a short interval, the gauge is again read and the housing is again rotated. The low point may now be moved to another point in the housing, though this is rarely the case. Should this occur, peening is again performed until an eccentricity of less than .001 of an inch is noted upon the rotation of the housing.

It is understood, of course, that the process may be practiced to any desired extent, depending upon the limits of accuracy desired. When no eccentricity is indicated on the gauge, the operator knows that the laminations contacting the gauge finger 15 are in alignment with the laminations supporting the flanges 12 and 13. In other words, the three groups of laminations are in alignment. The member 20 carrying the peening hammer 23 and the gauge assembly is then advanced so that the flange 13 engages the next set of non-magnetic laminations. The process is then repeated and the next set of laminations is aligned with the three just preceding. By successively aligning one set of laminations with the preceding two, the entire housing will be in alignment. While the drawings show member 11 only two sections long, longer members are used to check and correct alignment on greater distances anywhere in the motor-bore or full length of motor, i. e., ends vs. middle point.

Referring to Figure 4, the apparatus is similar to that shown in Figure 1, except that a portable electric peening hammer 46 is employed and the rod 18 is provided with calibrations 47. When using apparatus shown in Figure 4, the housing is marked externally with chalk marks indicating the positions at which the non-magnetic laminations appear and the calibrations 47 will indicate the proper positioning of the gauging assembly.

It will be clear to those skilled in the art that I have accomplished the objects of my invention. I am enabled to straighten elongated housings for electric motors adapted to drive deep well pumps. The straightening action is accomplished by elongating the metal of the low side of the housing, that is, when a housing is deviated or bowed, the peening takes place upon the concave or low side, in order to elongate the metal on this side, which elongation of metal straightens the deviation.

It is to be understood, of course, that I need not necessarily move the gauging member through a distance between the non-magnetic laminations. This mode of operating is cited for purposes of illustration only and not by way of limitation, as the gauging member may be moved progressively through short distances and thus effect the straightening of the entire housing in such cases as this is desired.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of straightening a bowed tubular metal housing having a wall including the step of peening the metal of the wall in the vicinity of the concave side of the housing to elongate the metal of the wall of the housing sufficiently to straighten said housing.

2. A method of straightening an elongated tubular metal housing having a wall including the steps of successively peening the metal wall of said housing to elongate the metal of the wall of the housing at successive concave places therealong sufficiently to straighten said housing.

3. A method of straightening a tubular metal housing having a wall including the steps of determining the eccentricity of said housing at a point between two separated points thereof, peening the metal of the housing wall only on the concave side of the point of greatest eccentricity to elongate the housing wall longitudinally whereby to remove said eccentricity and repeating the above step successively at a plurality of separated points along the length of the housing until said housing is straight.

4. A method of straightening the metal housing of an elongated electric motor including the steps of positioning the stator laminations within said housing, determining the point of greatest eccentricity between two separated points within said housing and peening the metal of said housing wall only upon the concave side thereof adjacent the point of greatest eccentricity to spread the metal of said housing wall longitudinally sufficiently to remove said eccentricity between said separated points and straighten said housing.

5. In an apparatus for straightening tubular housings, a gauge assembly comprising an elongated member, a pair of flanges adjacent the ends of said elongated member, a finger gauge carried by said member intermediate said flanges, said finger gauge having a finger adapted to contact the bore of a housing, means for positioning said gauge within said housing bore, means for causing relative rotation between said gauge and said housing, and means for peening the exterior of said housing.

6. In an assembly for straightening tubular housings, a support, means for rotatably positioning said housing upon said support, an elongated member adapted to be positioned within said housing, said member having a pair of flanges adapted to contact the interior walls of said housing, a finger gauge supported by said member intermediate said flanges, said finger gauge having a finger adapted to contact the interior wall of said housing, means for illuminating said gauge, said gauge being positioned for viewing from one end of said housing, means for causing relative rotation between said housing and said gauge carrying member, and means for peening the exterior of said housing.

7. In an assembly for straightening tubular housings, a support, means for rotatably positioning said housing upon said support, an elongated member adapted to be positioned within said housing, said member having a pair of flanges adapted to contact the interior walls of said housing, a finger gauge supported by said member intermediate said flanges, said finger gauge having a finger adapted to contact the interior wall of said housing, means for illuminating said gauge, said gauge being positioned for viewing from one end of said housing, means for causing relative rotation between said housing and said gauge carrying member, means for peening the exterior of said housing, and means operable from the exterior of said housing for moving said gauging finger from contact with said housing wall during the operation of said peening means.

ARMAIS ARUTUNOFF.